(12) United States Patent
Toyama et al.

(10) Patent No.: US 10,815,704 B2
(45) Date of Patent: Oct. 27, 2020

(54) VEHICLE DOOR OUTSIDE HANDLE DEVICE, VEHICLE DOOR, AND VEHICLE

(71) Applicant: ALPHA CORPORATION, Kanagawa (JP)

(72) Inventors: Takao Toyama, Yokohama (JP); Kouichirou Sugimoto, Yokohama (JP); So Saito, Yokohama (JP); Teruhisa Kato, Yokohama (JP)

(73) Assignee: ALPHA CORPORATION, Kanagawa (JP)

( * ) Notice: Subject to any disclaimer, the term of this patent is extended or adjusted under 35 U.S.C. 154(b) by 0 days.

(21) Appl. No.: 16/282,230

(22) Filed: Feb. 21, 2019

(65) Prior Publication Data

US 2019/0178013 A1  Jun. 13, 2019

Related U.S. Application Data

(63) Continuation of application No. PCT/JP2017/030192, filed on Aug. 23, 2017.

(30) Foreign Application Priority Data

Aug. 23, 2016 (JP) ................................ 2016-162631
Feb. 24, 2017 (JP) ................................ 2017-033260

(51) Int. Cl.
*E05B 85/16* (2014.01)
*G03B 15/00* (2006.01)
*B60R 11/04* (2006.01)
*G03B 29/00* (2006.01)
*E05B 85/10* (2014.01)
(Continued)

(52) U.S. Cl.
CPC ............... *E05B 85/107* (2013.01); *B60J 5/04* (2013.01); *B60R 1/00* (2013.01); *B60R 11/04* (2013.01); *E05B 85/103* (2013.01); *E05B 85/16* (2013.01); *G03B 15/00* (2013.01); *G03B 29/00* (2013.01);
(Continued)

(58) Field of Classification Search
CPC .......... E05B 85/107; B06J 5/04; G03B 15/00
See application file for complete search history.

(56) References Cited

U.S. PATENT DOCUMENTS 6,033,078 A * 3/2000 Su ............................. B60R 1/10
                                                        359/856
10,030,413 B2 * 7/2018 Kamimura ............ E05B 17/186
(Continued)

FOREIGN PATENT DOCUMENTS

DE      102006029892 A1    1/2008
DE   10 2013 219 341 A1    3/2015
(Continued)

OTHER PUBLICATIONS

International Search Report issued in PCT/JP2017/030192; dated Nov. 28, 2017.
(Continued)

*Primary Examiner* — Irfan Habib
(74) *Attorney, Agent, or Firm* — Studebaker & Brackett PC

(57) ABSTRACT

A vehicle door outside handle device includes a through hole opening toward a vehicle rear side in a protrusion portion from a door side wall. An optical lens and an imaging element disposed in the through hole toward the vehicle rear side captures a vehicle rear side image including a vehicle side wall image.

8 Claims, 14 Drawing Sheets

(51) Int. Cl.
*B60J 5/04* (2006.01)
*B60R 1/00* (2006.01)
*B60R 11/00* (2006.01)

(52) U.S. Cl.
CPC . *B60R 2011/004* (2013.01); *B60R 2011/0043* (2013.01); *E05Y 2900/531* (2013.01)

(56) References Cited

U.S. PATENT DOCUMENTS

| | | | |
|---|---|---|---|
| 2008/0049105 A1* | 2/2008 | Shimizu | G06T 7/73 348/148 |
| 2009/0135253 A1 | 5/2009 | Augst | |
| 2012/0069187 A1* | 3/2012 | Ozaki | G09G 5/14 348/148 |
| 2012/0154587 A1* | 6/2012 | Hwang | B60R 11/04 348/148 |
| 2012/0217764 A1 | 8/2012 | Ishiguro et al. | |
| 2013/0033602 A1* | 2/2013 | Quast | B60R 1/00 348/148 |
| 2016/0185292 A1 | 6/2016 | Asai | |

FOREIGN PATENT DOCUMENTS

| | | |
|---|---|---|
| EP | 2930293 A2 | 10/2015 |
| JP | H03-125168 U | 12/1991 |
| JP | H07-269177 A | 10/1995 |
| JP | 2003-078907 A | 3/2003 |
| JP | 2005-014673 A | 1/2005 |
| JP | 2011-105058 A | 6/2011 |
| JP | 2016-124391 A | 7/2016 |

OTHER PUBLICATIONS

Written Opinion of the International Searching Authority issued in PCT/JP2017/030192, dated Nov. 28, 2017.
Written Opinion of the International Preliminary Examining Authority issued in PCT/JP2017/030192, dated Sep. 11, 2018.
International Preliminary Report on Patentability issued in PCT/JP2017/030192; completed Dec. 6, 2018.
"2015 FIT" (Brochure), online, Nov. 3, 2014 (publication date), American Honda Motor Co., Inc, Nov. 15, 2017(search date), pp. 1-4, internet <URL:https://automobiles.honda.com/e-brochure/2015-fit/pdf/2015_Fit.pdf>.
The extended European search report issued by the European Patent Office dated Mar. 6, 2020, which corresponds to European Patent Application No. 17843655.6-1132 and is related to U.S. Appl. No. 16/282,230.

* cited by examiner

FIG. 5A
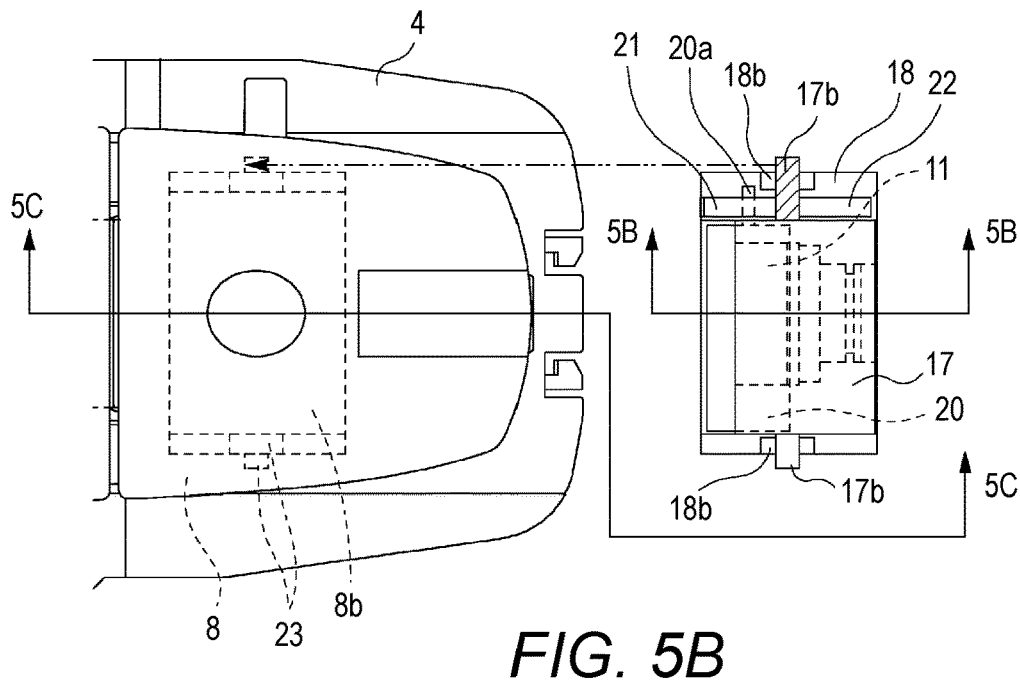
FIG. 5B
FIG. 5C
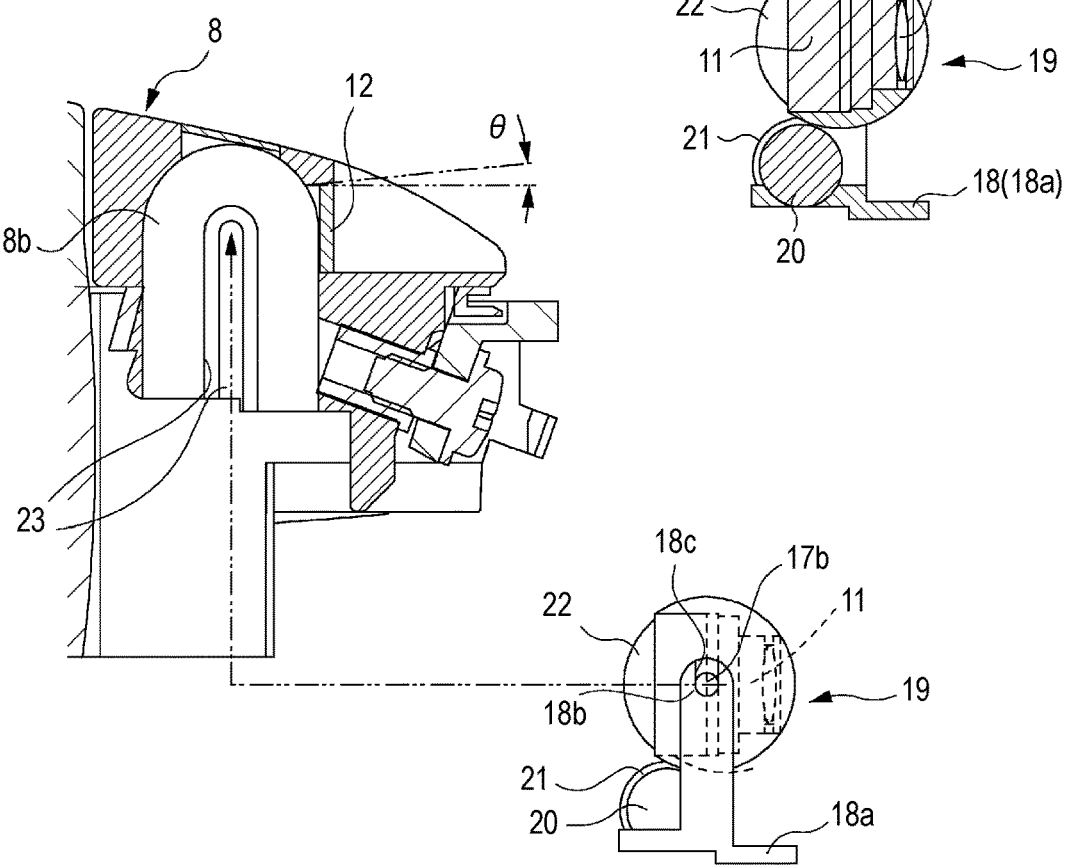

VEHICLE DOOR OUTSIDE HANDLE DEVICE, VEHICLE DOOR, AND VEHICLE

CROSS REFERENCE TO RELATED APPLICATIONS

This application is a continuation of PCT application No. PCT/JP2017/030192, which was filed on Aug. 23, 2017 based on Japanese Patent Application No. 2016-162631 filed on Aug. 23, 2016, and Japanese Patent Application No. 2017-033260 filed on Feb. 24, 2017, the contents of which are incorporated herein by reference.

TECHNICAL FIELD

The present disclosure relates to a vehicle door outside handle device, a vehicle door, and a vehicle.

BACKGROUND ART

Patent Literature 1 has disclosed a door outside handle device which can accommodate a camera and monitor an image outside a vehicle. An optical lens having an optical axis set in a vehicle width direction and an imaging element are arranged on a door handle.

In a related art, an outer mirror such as a door mirror is provided in a vehicle such as an automobile. The outer mirror is used when a driver visually recognizes rear and lateral rear sides of the vehicle and is provided so as to bulge outward on a side surface of the vehicle body. Such an outer mirror becomes a factor of increasing air resistance during vehicle travelling, and further, there is a case where an area that would be a blind spot of a driver is generated because there is a limitation on the shape and size of the mirror.

Therefore, Patent Literature 2 has disclosed an electronic mirror device in which imaging means such as a camera is mounted on a vehicle instead of an outer mirror. In the electronic mirror device, images of rear and lateral rear sides of the vehicle are captured by the imaging means and the captured images are displayed on a monitor in the vehicle cabin.

Further, Patent Literature 3 has disclosed a technique of mounting a camera on an outside handle of a side door of a vehicle for the purpose of detecting an obstacle during vehicle travelling.

PRIOR ART LITERATURE

Patent Literature

[Patent Literature 1]: JP-A-2005-14673
[Patent Literature 2]: JP-A-2016-124391
[Patent Literature 3]: JP-A-2011-105058

SUMMARY OF THE INVENTION

Technical Problem

However, in the examples of the related art described above, the image obtained by the imaging device is a lateral image of the vehicle and a side wall portion of the vehicle cannot be included in the image, and thus it is not possible to know a relative position with respect to the own position in the captured image. Therefore, there is a problem in that it cannot fulfill the role of a side mirror.

Further, in recent vehicles, flush-surfacing is required for design reasons and adopting an electronic mirror device instead of an outer mirror plays a role in making a flush surface. In the electronic mirror device, it is necessary to arrange imaging means at a position securing a rear view of the vehicle and, in the vehicle having no outer mirror, it is studied to mount the imaging means on a handle device disposed on an outer side of a vehicle door.

However, the trend of making the flush surface is not an exception even in the handle device, and thus a structure which is superior in unity with a vehicle body and rich in designability is required.

The present disclosure is made to address the drawbacks described above and an object thereof is to provide a vehicle door outside handle device capable of exhibiting a function as a side mirror and a vehicle door and a vehicle which can achieve both securing the rearward visibility during vehicle travelling and improving designability with a vehicle body having a flush surface.

Solution to Problem

In accordance with the present disclosure, a vehicle door outside handle device includes a through hole opening toward a vehicle rear side in a protrusion portion from a door side wall. An optical lens and an imaging element disposed in the through hole captures a vehicle rear side image including a vehicle side wall image.

In the present disclosure, since the vehicle rear side image including the vehicle side wall image can be captured, the own position can be accurately recognized with reference to the vehicle side wall. As a result, the vehicle door outside handle device can be used as a side mirror device, and thus it is possible to eliminate a side mirror device protruding in a vehicle width direction and reduce a portion protruding toward a vehicle lateral side.

In accordance with the present disclosure, a vehicle door outside handle device includes a handle main body connected to a handle base. A mirror reflecting incident light rays from a vehicle rear side toward an inner side in a vehicle width is fixed to the handle main body. An optical lens and an imaging element capturing a mirror image of the vehicle rear side reflected on the mirror are fixed to the handle base.

In accordance with the present disclosure, a vehicle door includes a door panel constituting an outside design surface of a door, and a handle device disposed in the door panel. The handle device includes a handle main body and an imaging unit mounted on the handle main body and capturing images of rear side and lateral rear side of a vehicle. The handle main body is configured to be accommodated inward of the door panel so as to be in an accommodated state that an outer surface of the handle main body is arranged substantially flat with respect to an outer surface of the door panel.

In accordance with the present disclosure, the handle main body is configured to be switched to be in a non-accommodated state that the handle main body protrudes outward from the door panel and the imaging unit is exposed to an outside of the door panel. Also, the non-accommodated state includes a protruding state that the handle main body protrudes to a state that the handle main body can be operated, and an intermediate state that a part of the handle main body partially protrudes and the imaging unit is exposed to the outside of the door panel.

The handle device includes a driving mechanism displacing the handle main body and a protrusion amount of the handle main body protruding outward from the door panel is changed in accordance with a state of a vehicle.

The handle main body is in the accommodated state, when a door lock device provided in the door is in a parking state which is a locked state. The handle main body is in the protruding state, when the door lock device is in an unlocked state in a non-travelling state of a vehicle. The handle main body is in the intermediate state, when the vehicle is in a travelling state.

The vehicle door constitutes a vehicle body side surface together with a vehicle body panel located on a vehicle rear side of the door panel, when the vehicle door is closed. The vehicle body side surface includes a groove portion having a concave shape and reaching at least from the handle main body to the vehicle rear side.

In accordance with the present disclosure, a vehicle including the above-described vehicle door.

Advantageous Effects of the Invention

According to the present disclosure, a rear image of a vehicle can be captured, and thus a function as a side mirror can be exhibited. Further, it is possible to achieve both securing rearward visibility during vehicle travelling and improving designability with a vehicle body having a flush surface.

BRIEF DESCRIPTION OF THE DRAWINGS

FIGS. 2A to 2C are cross-sectional views of FIG. 1 in which FIG. 2A is a cross-sectional view taken along the line 2A-2A in FIG. 1, FIG. 2B is an enlarged view of a main part of FIG. 2A, and FIG. 2C is a front view of an imaging module.

FIGS. 4A and 4B are cross-sectional views of FIG. 3 in which FIG. 4A is a cross-sectional view taken along the line 4A-4A in FIG. 3 and FIG. 4B is an enlarged view of a main part of FIG. 4A.

FIGS. 5A to 5C are views for illustrating a main part of a second embodiment of the present disclosure in which FIG. 5A is a view for illustrating the mounting of a camera unit, FIG. 5B is a cross-sectional view taken along the line 5B-5B in FIG. 5A, and FIG. 5C is a cross-sectional view taken along the line 5C-5C in FIG. 5A.

FIGS. 6A to 6C are views for illustrating an assembled state in FIGS. 5A to 5C in which FIG. 6A is a cross-sectional view for illustrating a normal operation mode, FIG. 6B is a cross-sectional view for illustrating a state that the camera unit is rotationally driven, and FIG. 6C is a cross-sectional view for illustrating a state that the camera unit is rotationally driven by 90°.

FIGS. 8A and 8B are cross-sectional views of FIG. 7 in which FIG. 8A is a cross-sectional view taken along the line 8A-8A in FIG. 7 and FIG. 8B is an enlarged view of a main part of FIG. 8A.

DESCRIPTION OF EMBODIMENTS

First Embodiment

Figure 1:
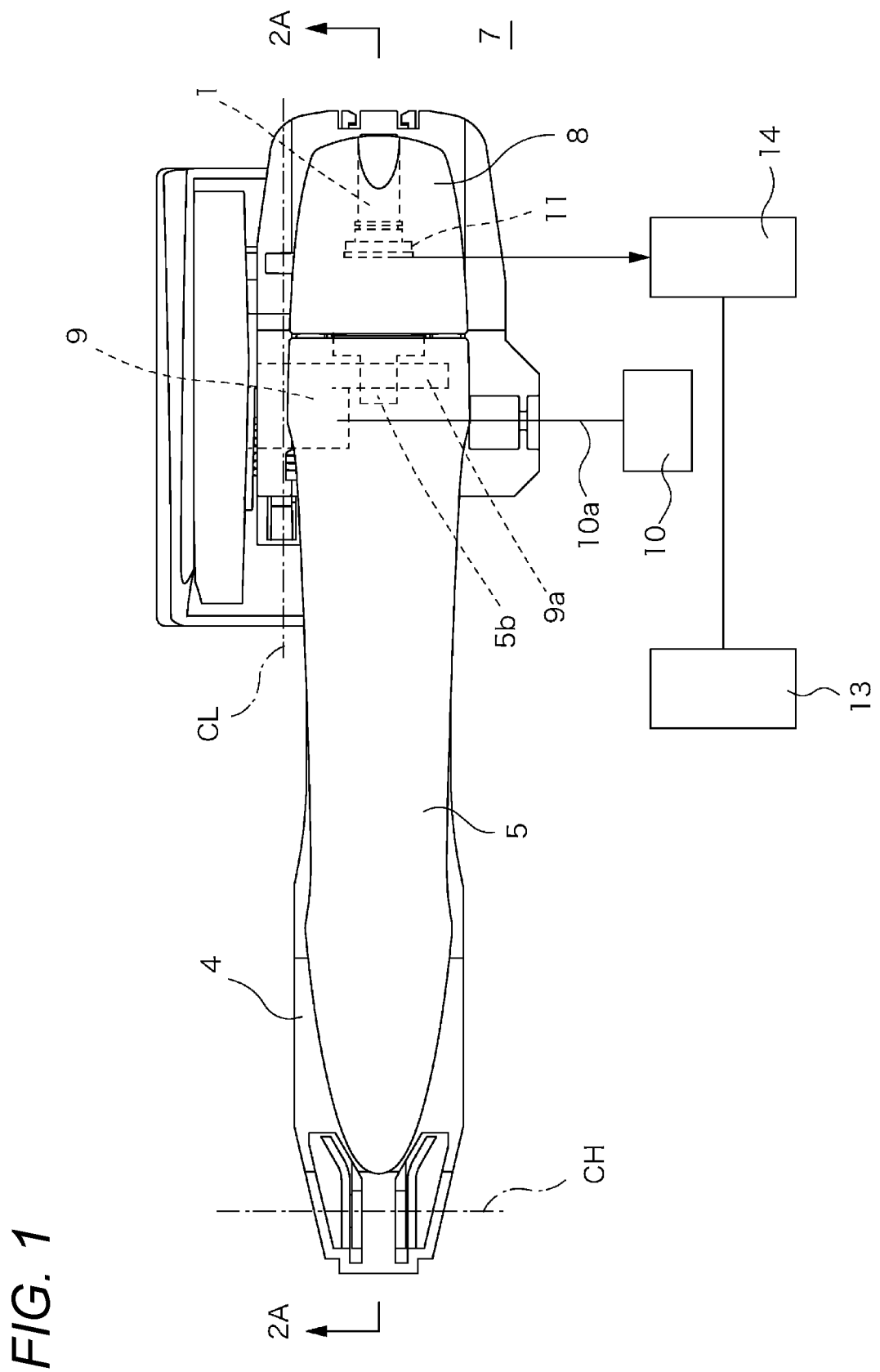
FIG. 1 is a front view for illustrating a first embodiment of the present disclosure.
Figure 2A:
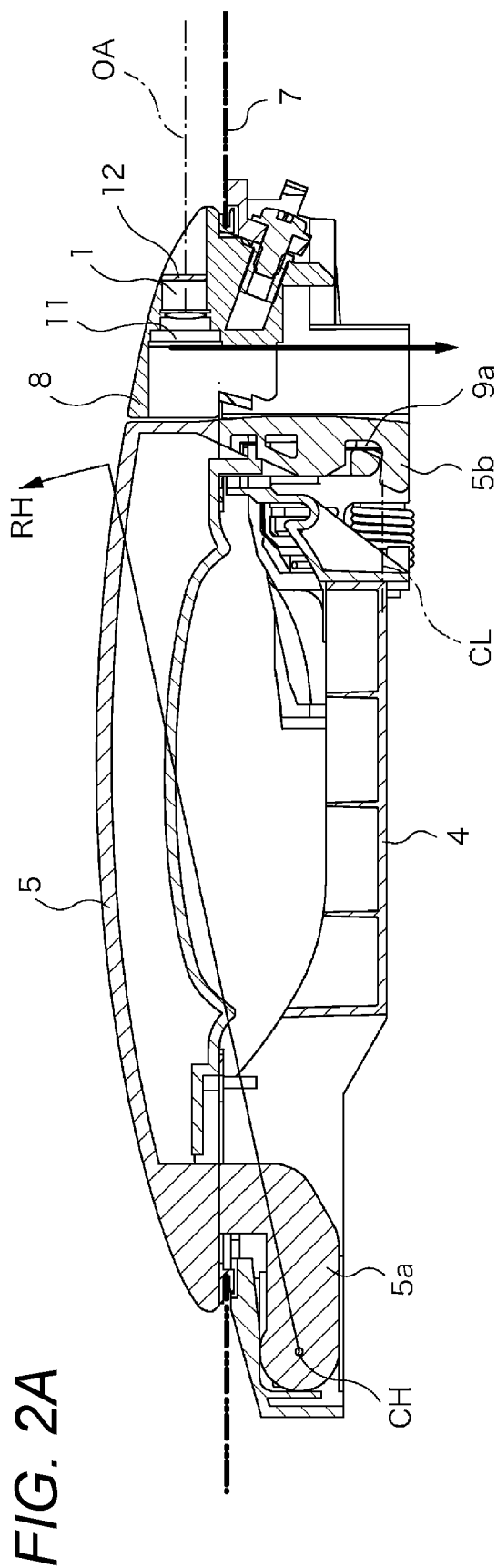
Figure 2C:
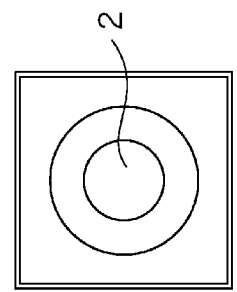

FIGS. 1 to 2C illustrate a first embodiment of the present disclosure. An outside handle according to the embodiment includes a handle base 4 fixed along a back surface of a door panel 7 constituting a vehicle side wall and a handle main body 5 connected to the handle base 4.

A hinge protrusion portion 5a is provided in a front end of the handle main body 5. After the hinge protrusion portion 5a is inserted into a door, the handle main body 5 is slid forward to be connected to the handle base 4. A stopper 8 is mounted to the handle base 4 in order to maintain the connected state by regulating rearward sliding of the handle main body 5 mounted as described above.

Figure 2B:
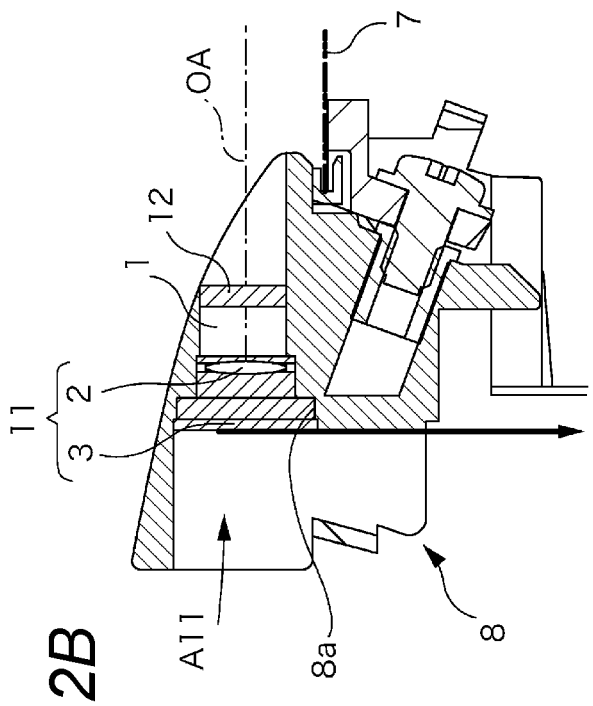

When the handle main body 5 is rotated around a rotation center (CH) from an initial position illustrated in FIGS. 2A to 2C in an arrow RH direction in a state that the handle main body 5 is connected to the handle base 4, a protrusion portion 9a of a relay lever 9 is pulled out to a surface side by an operating step portion 5b formed at a rear end of the handle main body 5 and the relay lever 9 rotates around a rotation center (CL) to operate a door latch device 10 via a cable device 10a.

As illustrated in FIGS. 2A to 2C, a through hole 1 is open toward a rear side in the stopper 8 and an imaging module 11 including an optical lens 2 and an imaging element 3 is accommodated in an innermost portion of the through hole.

The imaging module 11 is inserted in an attachment recess portion 8a formed at a front end portion of the through hole 1 from a front side to a rear side, that is, inserted in an arrow (A11) direction in FIG. 2B to be fixed at a predetermined position. Further, the through hole 1 is blocked by a protection cover 12 having a translucent property and fixed to a rear end portion of the through hole 1.

It is preferable that the fixed posture and the angle of view of the imaging module 11 and the size or the length of the through hole 1 be determined so that the image of the door panel 7 of the vehicle, that is, a side wall surface of the vehicle is included in a screen, thereby enabling to capture an image which makes it possible to determine its own position.

Further, as illustrated in FIG. 2B, in the fixed posture of the imaging module 11, an optical axis (OA) of the optical lens 2 is arranged substantially parallel with the side wall surface of the vehicle, and the fixed posture of the imaging module 11 can also be determined so that the imaging element 3 can capture a rear image along the side wall of the vehicle.

Therefore, when the output of the imaging module 11 of the outside handle in the present embodiment is connected to a monitor device 13 via appropriate amplification means and an image processing unit 14 such as interface means, an image of a lateral rear side of the vehicle can be captured, thereby enabling to constitute a lateral rear view recognition device which replaces a side mirror.

In this case, if the effective aperture of the optical lens 2 cannot be made large due to the space and therefore, the image becomes dark, when the brightness of the output from the imaging module 11 is adjusted to increase the brightness, the visibility is improved.

Further, when the handle devices are arranged in a front-rear direction as in the case of a four-door vehicle, it is sufficient to capture a rear image only from a rear handle device. However, when a rear image is captured from front and rear handle devices, images of from a lateral side of the driver's seat can also be obtained.

When an image is captured from the front handle device, the rear handle device is reflected in an image captured from the front handle device. However, when the area of the rear handle device in the image is excessively large, which affects the visibility, the visibility can be improved by performing image processing on the image captured by the front handle device.

As the image processing, it is possible to use processing where the rear handle device is imaged in advance and the reflection range in the captured image is stored, and then this range is replaced with an image captured from the rear handle device. In this case, it is preferable to maintain image continuity in a replacement image by applying processing for correcting image change due to a difference in the imaging position.

Additionally, as a method for specifying the reflection range at the time of image processing, an edge extraction process or the like can be performed on the image captured from the front handle device to directly determine the area or an area determination mark can also be set at an appropriate place on the rear handle device to determine the reflection area based on the mark in the image.

Figure 3:
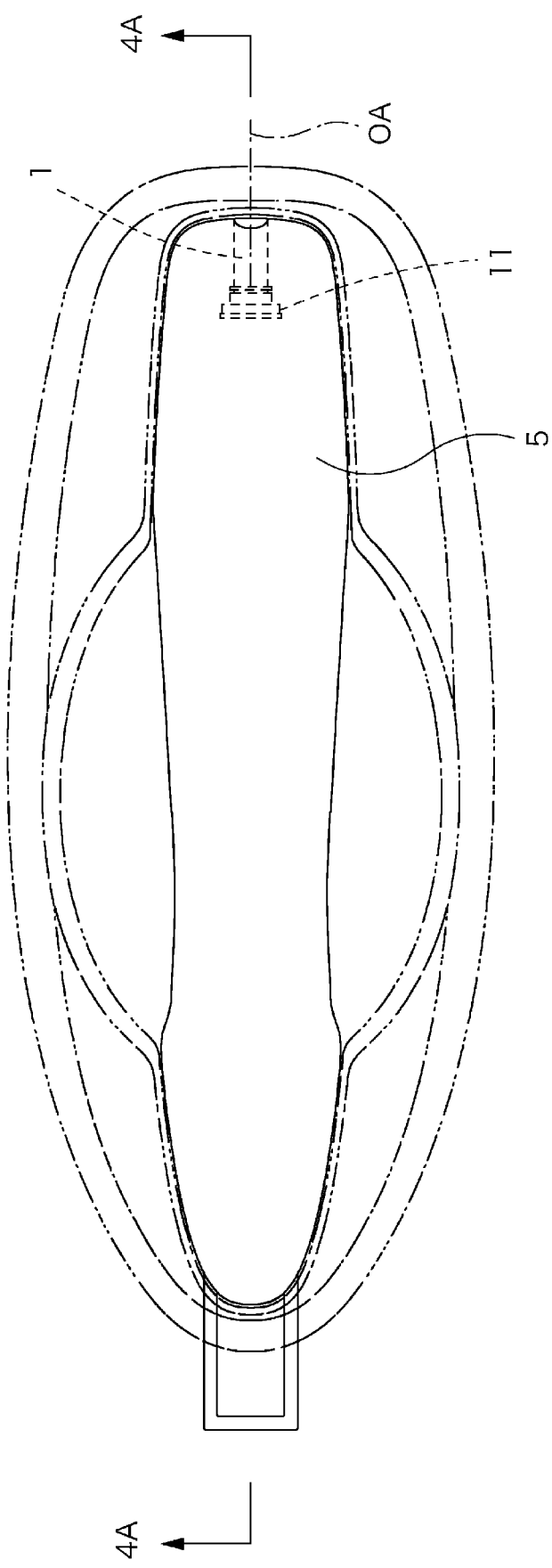
FIG. 3 is a front view for illustrating a modification example of FIG. 1.
Figures 4A, 4B:
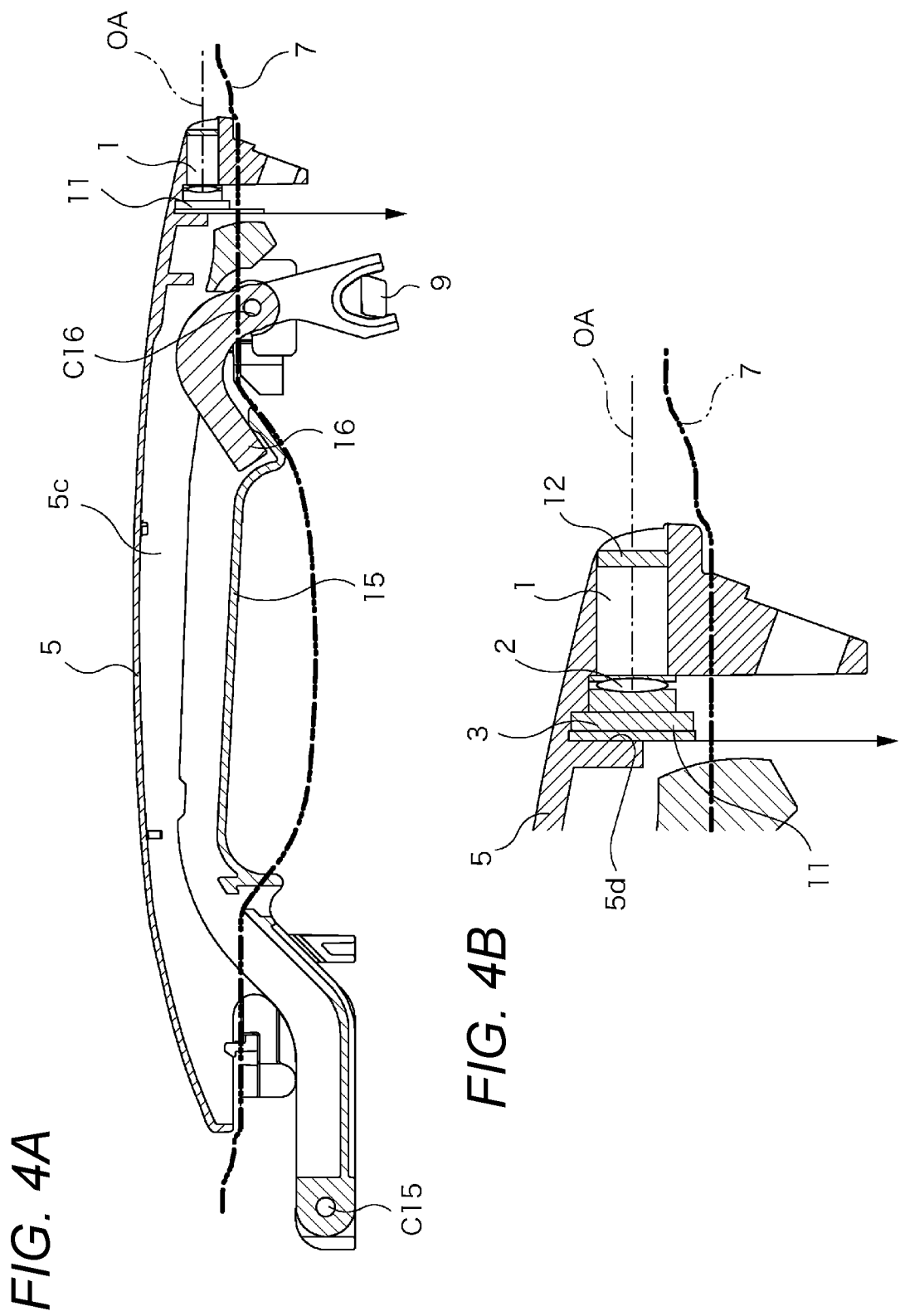

FIG. 3 and FIGS. 4A to 4B illustrate a modification example of FIG. 1. This example illustrates the modification example in which the imaging module 11 is accommodated in the handle main body 5. A handle device includes the handle main body 5 and an operation lever 15 connected to a rear surface of the handle main body 5 to be rotatable around a rotation center (C15) and the handle main body 5 is directly fixed to the door panel 7 without using the handle base 4.

In the following description, constituent elements which are substantially the same as those in the embodiment described above are denoted by the same reference numerals and letters in the drawings and the description thereof will be omitted.

When an operating lever is rotated by grasping a handgrip portion 5c of the handle main body 5, a second relay lever 16 rotates around a rotation center (C16) clockwise in FIG. 4A, and therefore, the relay lever 9 connected to a door latch device (not illustrated) rotates.

The imaging module 11 is disposed at a rear end portion of the handle main body 5 and a rear image is captured from the through hole 1 open toward a rear side of the handle main body 5. The imaging module 11 is mounted by being fitted from a rear surface side into an attachment recess portion 5d formed on a ceiling surface of the handle main body 5. Since the handle main body 5 is formed open to the rear surface side, it is preferable to encapsulate around the imaging module 11 with an encapsulating resin or the like.

Second Embodiment

FIGS. 5A to 5C and 6A to 6C illustrate a second embodiment of the present disclosure. In the embodiment, the imaging module 11 is configured to be rotatable, and the imaging module 11 is fixed to a module case 17 having a cylindrical shape and open rearward. As illustrated in FIG. 5B, a module accommodation recess portion 17a which is open rearward is formed in the module case 17 and the imaging module 11 is mounted by being fitted into the module accommodation recess portion 17a from a left side in FIG. 5B.

The module case 17 in which the imaging module 11 is embedded is connected to a unit base 18 to constitute a camera unit 19. In the unit base 18, a pair of hinge blade pieces 18b are erected from a base plate 18a. The module case 17 described above is freely turnably connected to the unit base 18 by fitting shaft portions 17b protruding on both side walls into bearing recess portions 18c of the hinge blade pieces 18b.

In addition, a motor 20 is fixed to an upper side of the base plate 18a as an actuator and a first gear 21 fixed to a drive shaft 20a of the motor 20 meshes with a second gear 22 which is connected to the shaft portion 17b protruding from the module case 17 so as not to be freely turnable.

In the stopper 8, a unit accommodation recess portion 8b is formed which is open toward the rear surface side and into which the above-described camera unit 19 can be inserted from the rear surface side. The ceiling wall of the unit accommodation recess portion 8b is formed with a curved surface substantially matching an outer circumferential curvature of the module case 17, and on a side wall of the unit accommodation recess portion 8b, a sliding recess portion 23 capable of fitting the hinge blade piece 18b of the camera unit 19 and a tip portion of the shaft portion 17b protruding from the hinge blade pieces 18b is formed. The camera unit 19 can be fixed at a predetermined position by being inserted through an opening to a rear surface side of the unit accommodation recess portion 8b of the stopper 8.

Furthermore, in the stopper 8 described above, the through holes 1 open toward a rear side and a surface side are formed with the optical axis (OA) of the imaging module 11 as the center. As illustrated in FIG. 5C, in the through hole 1 facing rearward, a wall surface on the surface side is turned to the surface side by an appropriate angle (θ) with respect to a horizontal direction.

Figure 6A:
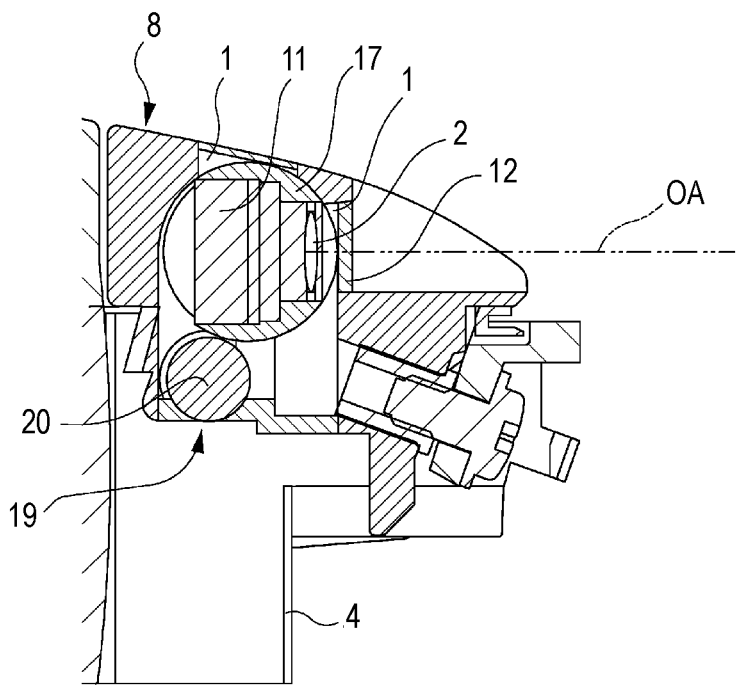

After the configuration described above, during the normal operation, the imaging module 11 is held at a first rotational position where the optical axis (OA) becomes horizontal as illustrated in FIG. 6A, and in this state, the rear image including the door panel 7 is displayed on the monitor device 13. Further, in a state illustrated in FIG. 6A, the through hole 1 open to the surface side is blocked by a curvature surface of the outer circumference of the module case 17, so that the entry of external light rays is prevented.

Figure 6B:
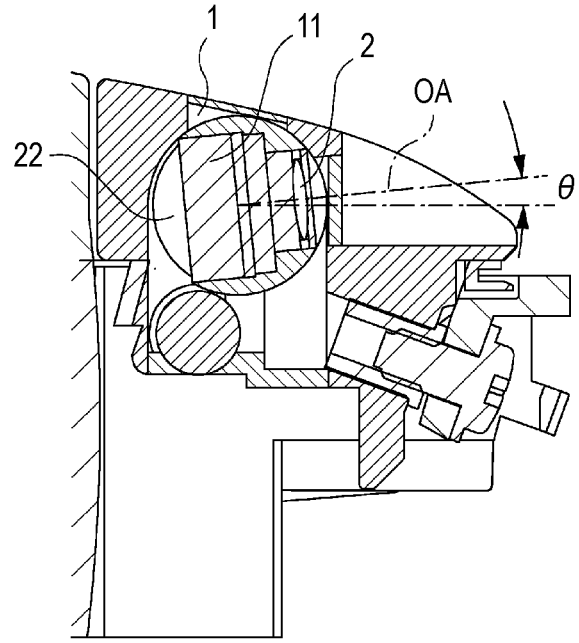
Figure 6C:
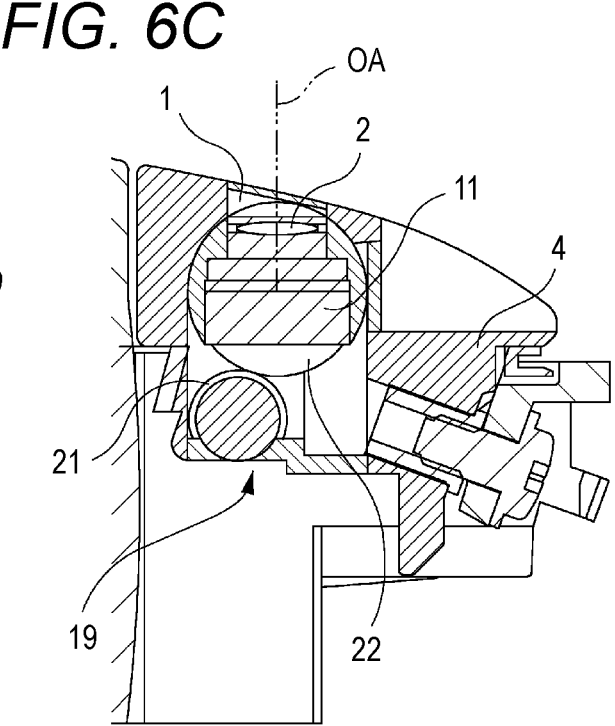

From this state, the imaging module 11 can be rotated between a second rotational position illustrated in FIG. 6B which is turned by the angle (θ) of the through hole 1 and a third rotational position rotated by 90 degrees from a first rotational angle by driving the motor. The control of the rotational position can be performed, for example, by operating a viewing angle adjusting unit set in the driver's seat and, when acquiring an image slightly turned toward a lateral side of the vehicle, it is possible to select the second rotational position.

In those second and third rotational positions, the through hole 1 which does not introduce light rays is blocked by the curvature surface of the outer circumference of the module case 17, thereby preventing the entry of external light rays.

Furthermore, when, for example, an in-vehicle computer detects that there is no electronic key inside the cabin, the imaging module 11 is rotated to the third rotational position, so that the captured image can be used as an authentication image, or so that by recording the captured image, the imaging module 11 can be used as a security camera. When the imaging module 11 is used as a security camera in the third rotational position, a fish-eye lens can be attached instead of a protective cover 12 to extend the imaging range.

Third Embodiment

Figure 7:
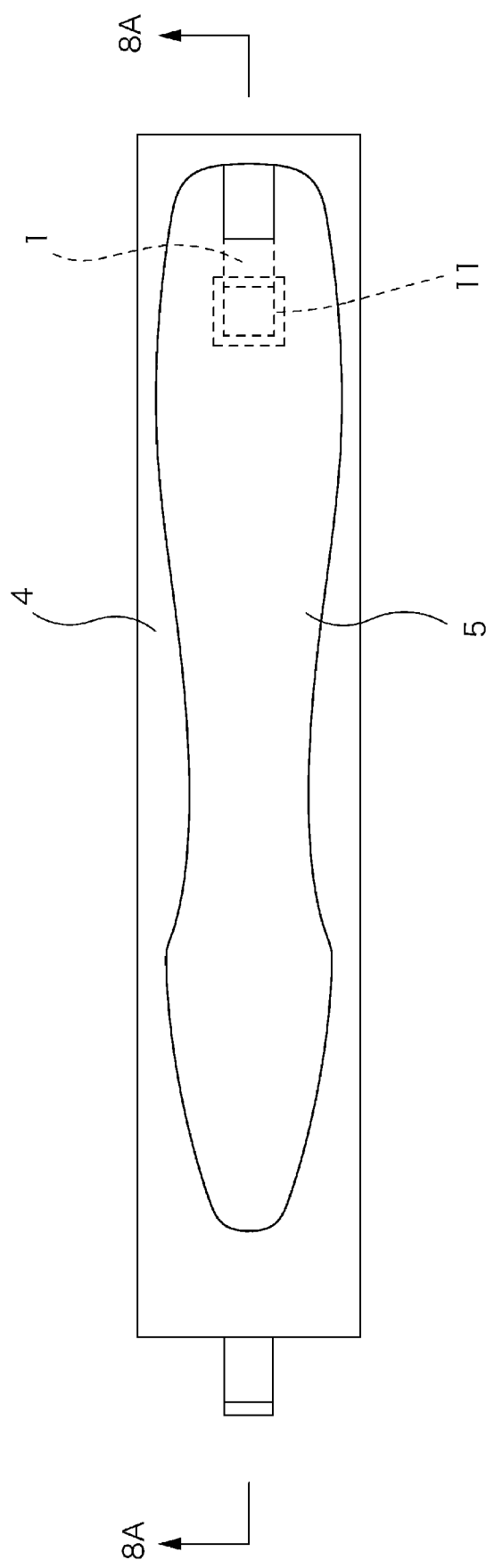
FIG. 7 is a front view for illustrating a third embodiment of the present disclosure.
Figure 8A:
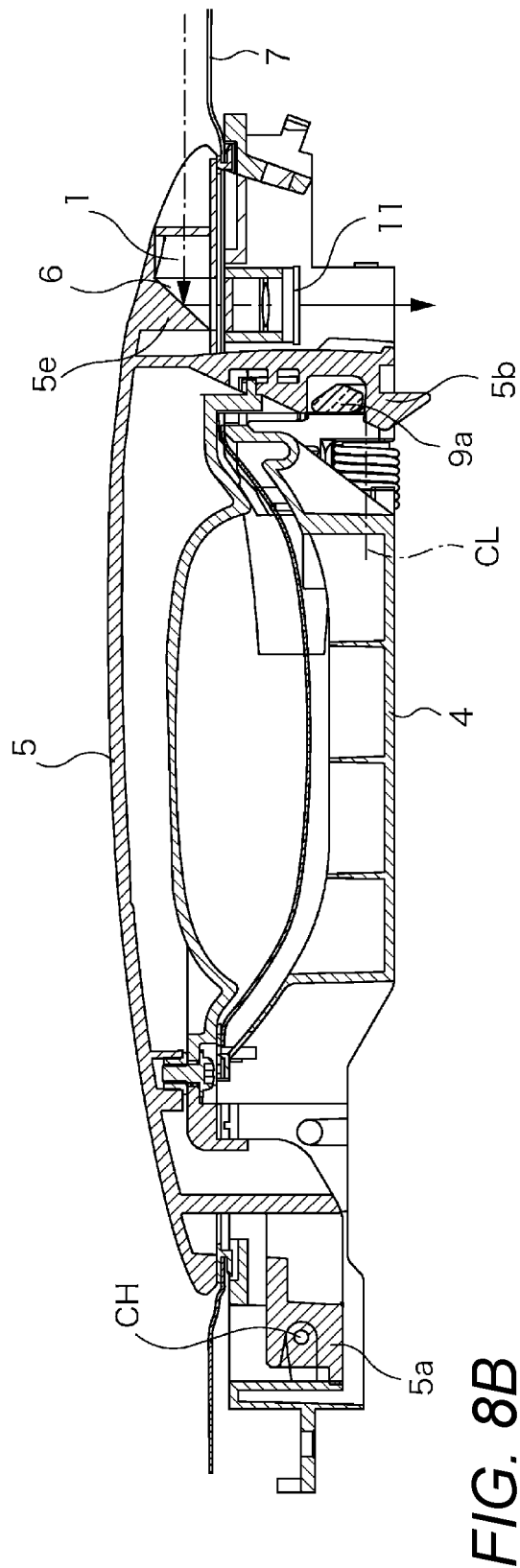
Figure 8B:
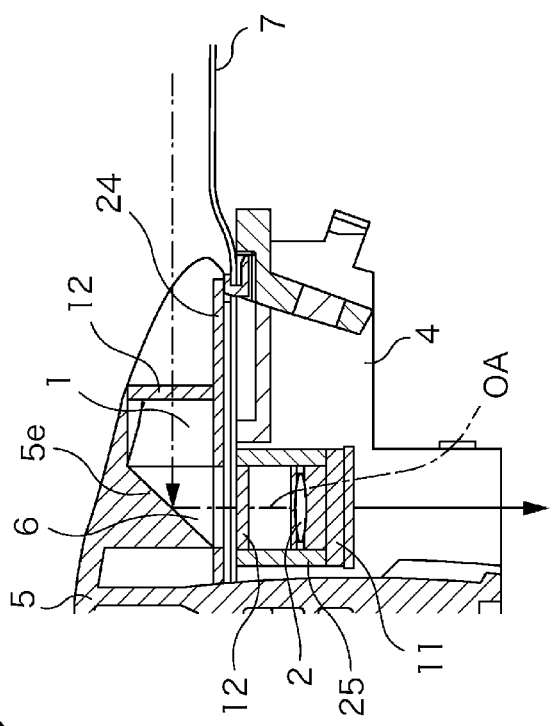

FIGS. 7, 8A, and 8B illustrate a third embodiment of the present disclosure. As similar to the embodiment illustrated in FIG. 1, the outside handle device of the embodiment is formed by connecting the handle main body 5 to the handle base 4 fixed to a rear surface of the door panel 7. When the handle main body 5 is rotated around the rotation center (CH), a protrusion portion of the relay lever 9 is pulled out to the surface side by the operating step portion 5b to rotate the relay lever 9, and then, the door latch device 10 is operated via the cable device 10a.

In the embodiment, a mirror 6 which requires a relatively small mounting volume is arranged in the handle main body 5 and an imaging module 11 which requires a large volume is arranged on the handle base 4 side.

In this example, a prism is used as the mirror 6 and is fixed to a mirror seating surface 5e formed at an innermost portion of the through hole 1. In order to prevent dust from entering the through hole 1, an opening toward the rear surface of the handle main body 5 is blocked by a blocking plate 24. The blocking plate 24 is formed of an opaque material in order to prevent direct incidence from the through hole 1 into the imaging module 11 and only a portion in contact with the prism 6 is formed of a transparent material.

The imaging module 11 is covered by a cylindrical body 25 formed of an opaque material and is fixed to the handle base 4 by appropriate means. In order to prevent dust from entering the cylindrical body 25, an opening end of the cylindrical body 25 is blocked by the protective cover 12 having a transparent property.

Therefore, in this example, light rays introduced into the through hole 1 from the rear side of the vehicle is reflected by the prism 6 and guided to the imaging module 11, thereby obtaining an image of the rear side of the vehicle.

(Notes)
(Note 1)

A vehicle door outside handle device which can capture an image of a vehicle rear side including a side wall of the vehicle by using the embedded optical lens 2 and imaging element 3.

(Note 2)

A vehicle door outside handle device in which the optical lens 2 arranged with the optical axis (OA) along a side wall surface of a vehicle and the imaging element 3 acquiring an image of a vehicle rear side formed by the optical lens 2 are embedded.

(Note 3)

The vehicle door outside handle device according to Note 2 in which the imaging module 11 can be rotated until the optical axis (OA) of the optical lens 2 is aligned to be parallel with a vehicle width direction.

(Note 4)

The vehicle door outside handle device according to Note 1, 2, or 3 in which the imaging module 11 can be moved to a non-use position.

(Note 5)

The vehicle door outside handle device according to any one of Notes 1 to 4 in which the optical lens 2 and the imaging element 3 are accommodated in the handle main body 5 which provides a handgrip during a door opening operation.

(Note 6)

The vehicle door outside handle device according to any one of Notes 1 to 5, including:
the handle main body 5 which is freely rotatably connected to the handle base 4 fixed in a door at a front end and provides the handgrip during the door opening operation; and
the stopper 8 which is fixed to a door surface and restricts rearward movement of the handle main body 5, in which
the optical lens 2 and the imaging element 3 are accommodated in the stopper 8.

(Note 7)

A vehicle door outside handle device, including:
the handle main body 5 connected to the handle base 4, in which
the mirror 6 for reflecting incident light rays from a vehicle rear side toward an inner side in a vehicle width is fixed to the handle main body 5, and
an optical lens and an imaging element for imaging a mirror image of the vehicle rear side reflected on the mirror 6 are fixed to the handle base 4.

(Note 8)

The vehicle door outside handle device according to Note 7, in which the mirror 6 can be rotatably driven.

(Note 9)

A vehicle lateral rear view recognition device, including:
vehicle door outside handle devices aligned in a vehicle front-rear direction in which optical lenses 2 and imaging elements 3 acquiring images of a vehicle rear side formed by the optical lenses 2 are embedded, and
an image supplementing unit for supplementing a reflection area of a rear handle in an captured image by a front handle with an captured image by a rear handle.

Fourth Embodiment

Figure 9:
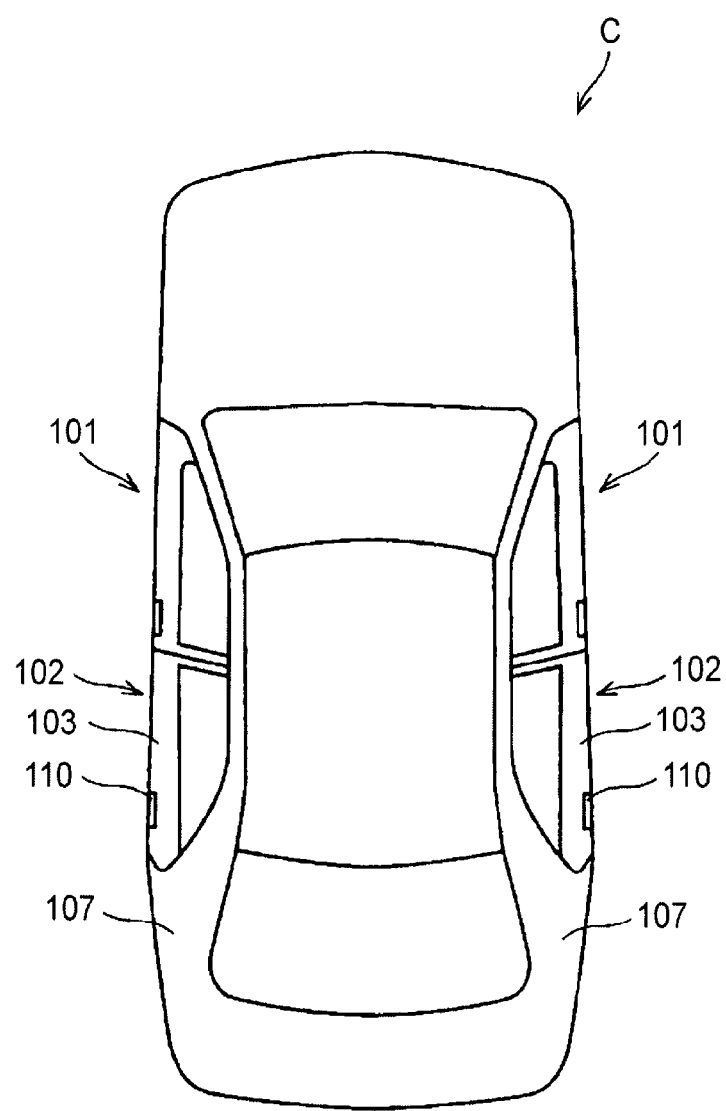
FIG. 9 is an explanatory view for illustrating a vehicle to which a vehicle door according to a fourth embodiment is applied.
Figure 10:
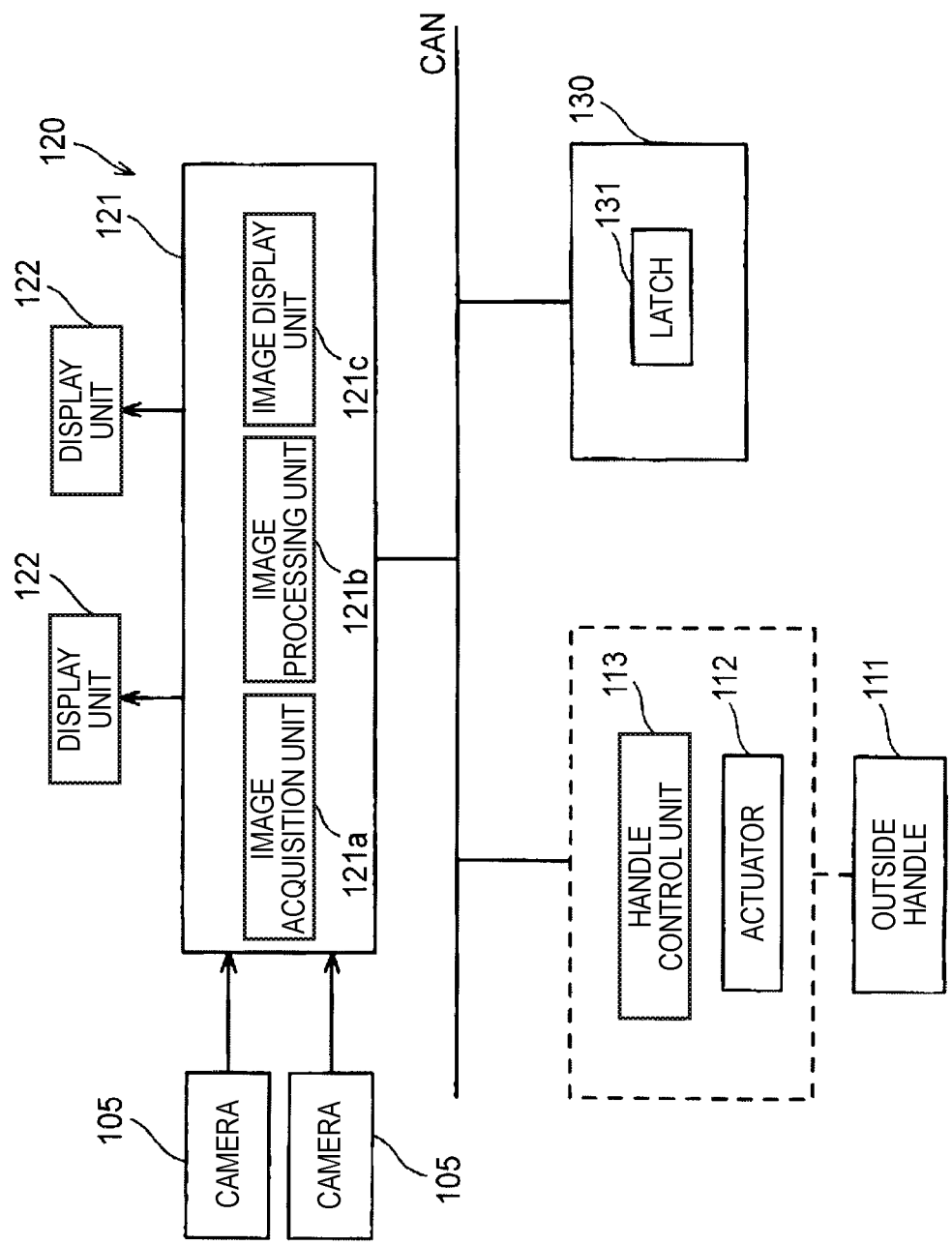
FIG. 10 is a block diagram for illustrating a system configuration of the vehicle according to the fourth embodiment.

Hereinafter, a vehicle C to which a vehicle door according to the embodiment is applied will be described. Here, FIG. 9 is an explanatory view for illustrating the vehicle C to which the vehicle door according to a fourth embodiment is applied. FIG. 10 is a block diagram for illustrating a system configuration of the vehicle C according to the embodiment. The vehicle C according to the embodiment is, for example, an automobile of a type having a pair of right and left front side doors 101 and a pair of right and left rear side doors 102. Hereinafter, a rear side door 102 will be described by way of example.

The rear side door 102 includes a door outer panel 103 and a door inner panel (not illustrated). The door outer panel 103 is a metal door panel constituting the outer design surface of the rear side door 102. On the other hand, the door inner panel is a metal door panel constituting a part of a wall surface panel of the vehicle cabin, and a door trim as an interior member is mounted on a cabin side of the door inner panel. When the rear side door 102 is closed, the rear side door 102 forms a vehicle body side surface together with a vehicle body panel 107 connected to a vehicle rear side of the door outer panel 103.

The rear side door 102 is provided with a door lock device 130. The rear side door 102 maintains a closed state by locking a latch 131 provided in the door lock device 130 to the vehicle body. The latch 131 provided in the door lock device 130 can perform a releasing operation by a handle device 110 described below. Specifically, when the door lock device 130 is in an unlocked state, the releasing operation of the latch 131 by the handle device 110 is permitted. On the other hand, when the door lock device 130 is in a locked state, the releasing operation of the latch 131 by the handle device 110 is prohibited.

Switching between the locked state and the unlocked state of the door lock device 130 can be performed by a pivoting operation of a lock knob provided on a cabin side of the rear side door 102, or a locking signal (an instruction signal for switching the door lock device 130 from the unlocked state to the locked state) or an unlocking signal (an instruction signal for switching the door lock device 130 from the locked state to the unlocked state) through a remote control key or the like.

The rear side door 102 is provided with a handle device 110 for opening or closing the rear side door 102 through the releasing operation of the latch 131. The handle device 110 is connected to the door lock device 130 via a cable device (not illustrated).

The handle device 110 is provided with an outside handle (handle main body) 111 for opening or closing the rear side door 102. The outside handle 111 is disposed on the door outer panel 103 and serves as a handgrip (grip) during the opening or closing operation of the rear side door 102. The outside handle 111 has, for example, an elongated shape and is disposed on the door outer panel 103 in a posture in which a longitudinal direction thereof matches the front-rear direction of the vehicle C. When an operating force is transmitted to the door lock device 130 via the cable device in accordance with the operation of the outside handle 111, the latch 131 of the door lock device 130 is released. Thereby, the rear side door 102 can be opened.

The vehicle C is equipped with an electronic mirror device 120. The electronic mirror device 120 is a device which recognizes a rear view using an imaging means instead of an outer mirror such as a door mirror. The electronic mirror device 120 is mainly constituted of a pair of right and left cameras 105 mounted on the vehicle C, an electronic mirror control unit 121, and a pair of display units 122 corresponding to the right and left cameras 105.

The cameras 105 are provided on both the right and left vehicle body side surfaces, and in the embodiment, each camera is mounted on the outside handle 111 of the rear side door 102. Each camera 105 is disposed at a rear end portion of the outside handle 111 to face the rear side of the vehicle C and captures the rear view of the vehicle C, that is, the rear and lateral rear sides of the vehicle C (imaging unit). Specifically, the camera 105 of the right rear side door 102 captures images of the rear side and right lateral rear side of the vehicle C and the camera 105 of the left rear side door 102 captures images of the rear side and left lateral rear side of the vehicle C. A digital camera using an imaging element such as a CMOS and a CCD and a wide angle lens is preferable as the camera 105.

The electronic mirror control unit 121 controls the electronic mirror device 120 and, when the electronic mirror control unit 121 is functionally grasped, the electronic mirror control unit 121 is constituted of an image acquisition unit 121a, an image processing unit 121b, and an image display unit 121c. A microcomputer constituted mainly of a CPU, a ROM, a RAM, and an I/O interface can be used as the electronic mirror control unit 121.

The image acquisition unit 121a is connected to the right and left cameras 105 and captures the captured images of the rear and lateral rear sides of the vehicle C from the right and left cameras 105 at certain intervals. The image processing unit 121b cuts out the captured image captured by the image acquisition unit 121a according to a predetermined cut-out range and generates a display image. The image processing unit 121b generates right and left display images corresponding respectively to the right and left cameras 105. When the image display unit 121c receives the display images from the image processing unit 121b, the image display unit 121c displays images on the pair of display units 122. In this case, the image processing unit 121b displays the display image processed from the camera 105 on the right side on a display unit 122 corresponding to the camera 105 on the right side and the image processing unit 121b displays the display image processed from the camera 105 on the left side on a display unit 122 corresponding to the camera 105 on the left side.

The pair of display units 122 are, for example, organic EL displays or liquid crystal displays. Each display unit 122 is connected to the electronic mirror control unit 121. The pair of display units 122 are respectively disposed, for example, at base end portions of front pillars located on both sides of a windshield in the vehicle cabin. The display unit 122 corresponding to the camera 105 on the right side is arranged at the base end portion of the right front pillar and the display unit 122 corresponding to the camera 105 on the left side is arranged at the base end portion of the left side front pillar. However, the pair of display units 122 may be provided in another part, for example, on an instrument panel, of the vehicle interior. The pair of display units 122 are not necessarily constituted of two physically separated displays and may be constituted by dividing a display area of a single display into two.

As one of the features of the embodiment, the outside handle 111 of the handle device 110 is configured to be movable in an inward-outward direction of the door outer panel 103. The outside handle 111 can adjust the protrusion amount protruding outward from the door outer panel 103, through displacement in the inward-outward direction. The movement of the outside handle 111 is realized by a well-known drive mechanism, for example, an actuator 112 such as an electric motor.

The handle device 110 includes a handle control unit 113 for controlling the operation amount of the actuator 112, that is, the protrusion amount of the outside handle 111, and the handle control unit 113 controls switching of the protrusion amount according to the state of the vehicle C.

In order to detect the state of the vehicle C, the handle control unit 113 can capture various signals through CAN or the like. The state of the vehicle C detected by the handle control unit 113 indicates, for example, whether the vehicle C is in a parking state, whether the vehicle C is in a travelling state, or whether the door lock device 130 of the vehicle C is in a locked or unlocked state. The handle control unit 113 specifies the state of the vehicle C through a shift position signal indicating the location of the shift position, a vehicle speed signal indicating the vehicle speed, and a status signal indicating the operation state of the door lock device 130.

Figure 11A:
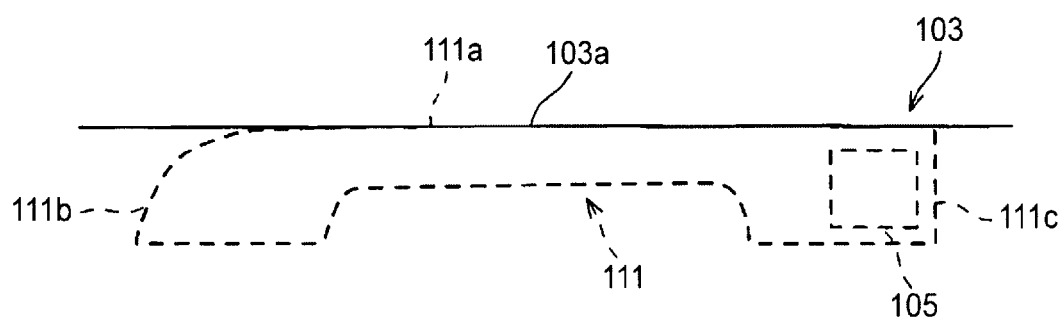
FIGS. 11A to 11C are explanatory views for illustrating a state of an outside handle.
Figure 11B:
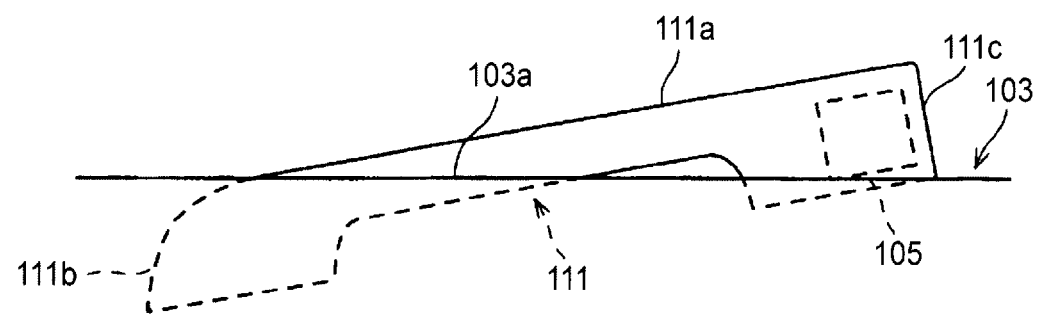
Figure 11C:
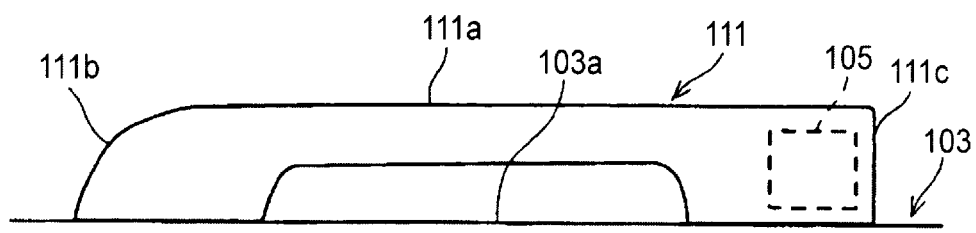

FIGS. 11A to 11C are explanatory views for illustrating the state of the outside handle 111. The outside handle 111 can take an accommodated state or a non-accommodated state.

As illustrated in FIG. 11A, the accommodated state is a state that the entire area of the outside handle 111 is accommodated inward of the door outer panel 103, so that an outer surface 111a of the outside handle 111 is arranged substantially flat with respect to an outer surface 103a of the door outer panel 103.

On the other hand, the non-accommodated state is a state that the outside handle 111 protrudes outward from the door outer panel 103 and the camera 105 is exposed to the outside of the door outer panel 103. The non-accommodated state includes two states consisting of a protruding state and an intermediate state.

The protruding state is a state that the outside handle 111 completely protrudes from the door outer panel 103 as illustrated in FIG. 11C. In this case, the completely protruding state means a state that a passenger can operate the outside handle 111 by gripping the outside handle 111. In the protruding state, the outside handle 111 further protrudes compared to that in the intermediate state described below, and thus, the camera 105 mounted on the outside handle 111 is also exposed to the outside of the door outer panel 103.

As illustrated in FIG. 11B, the intermediate state is a state intermediate between the accommodated state and the protruding state. Specifically, the intermediate state refers to a state that a part of the outside handle 111 partially protrudes and the camera 105 mounted on the outside handle 111 is exposed to the outside of the door outer panel 103. In the embodiment, since the camera 105 is mounted on a rear end portion 111c of the outside handle 111, the intermediate state is a state that the rear end portion 111c side partially protrudes while a front end portion 111b of the outside handle 111 is accommodated.

As described above, the outside handle 111 according to the embodiment can be switched between two states roughly divided into the accommodated state and the non-accommodated state. When the state is more finely divided, the outside handle 111 can be switched between three states including the accommodated state, the protruding state, and the intermediate state.

As an aspect of displacing the outside handle 111 by the actuator 112, the entire handle device 110 including the outside handle 111 may be displaced or only the outside handle 111 as a single body may be moved. However, in the latter method, the handle device 110 need to be configured so that the releasing operation of the latch 131 is not hindered even when only the outside handle 111 is moved.

Figure 12:
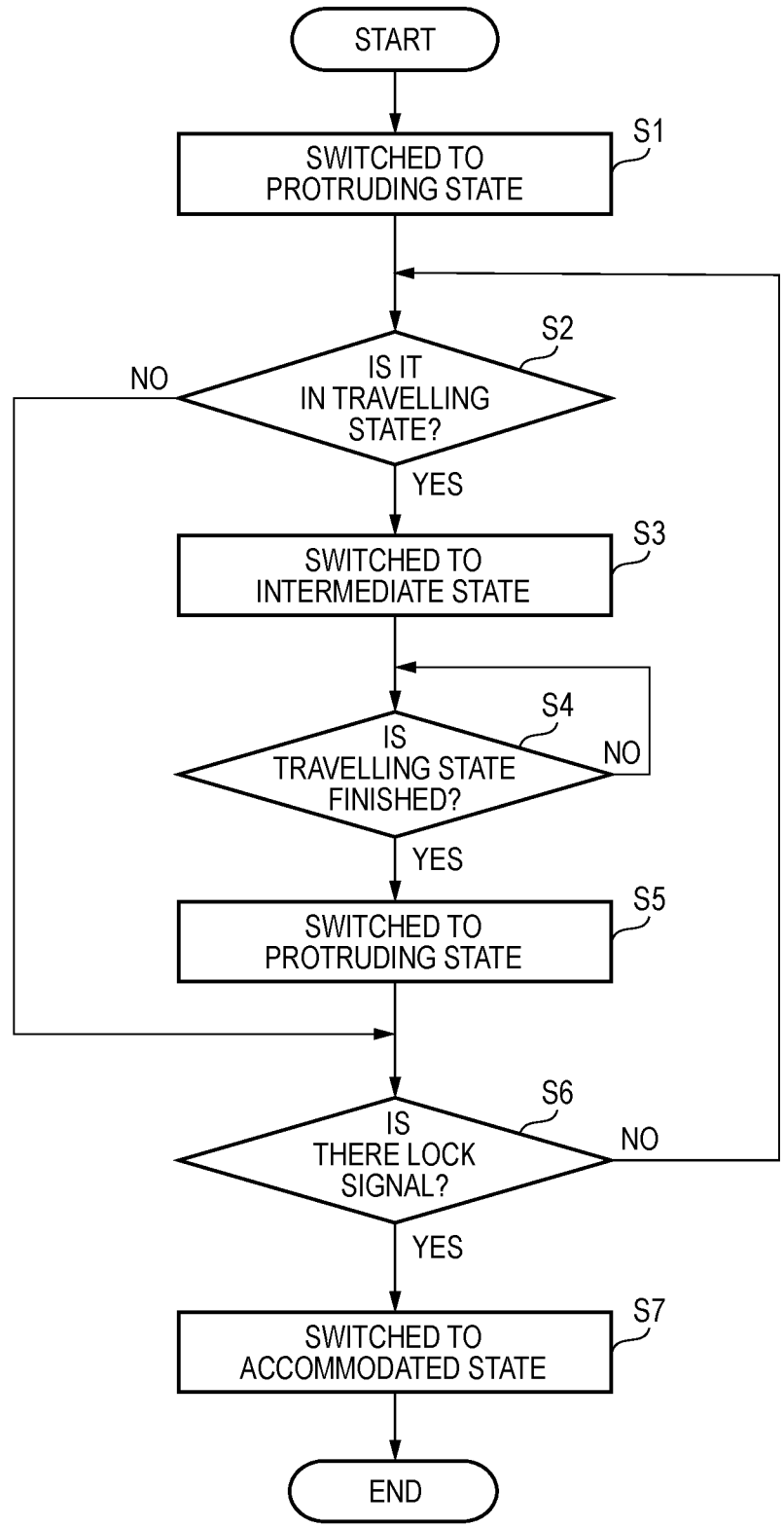
FIG. 12 is a flow chart for illustrating a flow of switching control of the outside handle.

Hereinafter, switching control of the outside handle 111 will be described. FIG. 12 is a flowchart for illustrating a flow of the switching control of the outside handle 111. Here, in the following description, it is assumed that the vehicle C is parked and the door lock device 130 is in the locked state. In this state, the outside handle 111 is set to the accommodated state.

The process illustrated in the flowchart is executed by the handle control unit 113 with the unlock signal for the door lock device 130 as a trigger.

First, in Step 1 (S1), the handle control unit 113 switches the state of the outside handle 111 to the protruding state.

In Step 2 (S2), the handle control unit 113 determines whether the vehicle C is in the travelling state. Here, the travelling state of the vehicle C means a state that the vehicle C is travelling or a state that the vehicle C can travel. Specifically, when a shift position signal indicates a state of parking (P), the handle control unit 113 determines that the vehicle C is in a parking state and, when the shift position signal indicates a state other than parking, the handle control unit 113 determines that the vehicle C is in a travelling state. When the vehicle C is in the travelling state, an affirmative determination is made in Step 2 and the process proceeds to Step 3 (S3). On the other hand, when the vehicle C is not in the travelling state, a negative determination is made in Step 2 and the process proceeds to Step 6 (S6) described below.

In Step 3, the handle control unit 113 switches the state of the outside handle 111 to the intermediate state.

In Step 4 (S4), the handle control unit 113 determines whether the travelling state is finished. When the vehicle C is still in the travelling state, a negative determination is made in Step 4 and the process returns to Step 4. On the other hand, when the travelling state is finished, an affirmative determination is made in Step 4 and the process proceeds to Step 5 (S5).

In Step 5, the handle control unit 113 switches the state of the outside handle 111 to the protruding state.

In Step 6, the handle control unit 113 determines whether there is a lock signal with respect to the door lock device 130. When there is a lock signal, an affirmative determination is made in Step 6, and the process proceeds to Step 7 (S7). On the other hand, when there is no lock signal, a negative determination is made in Step 6 and the process returns to Step 2.

In Step 7, the handle control unit 113 switches the state of the outside handle 111 to the accommodated state and finishes the routine (END).

As described above, the rear side door 102 according to the embodiment includes the door outer panel 103 constituting the outer design surface thereof and the handle device 110 disposed in the door outer panel 103. Here, the handle device 110 includes the outside handle 111 which is the handle main body, the camera 105 which is mounted on the outside handle 111 for capturing images of the rear and lateral rear sides of the vehicle C, and the actuator 112 for displacing the outside handle 111. In the outside handle 111, the protrusion amount protruding outward from the door outer panel 103 is switched according to the state of the vehicle C.

According to the configuration, since the protrusion amount of the outside handle 111 can be switched in accordance with the state of the vehicle C, it is possible to realize a flush surface of the vehicle body or to ensure a rearward visibility when the vehicle is travelling. As a result, it is possible to achieve both securing the rearward visibility during vehicle travelling and improving design property with the vehicle body having a flush surface.

Further, in the embodiment, the outside handle 111 is switched between the accommodated state and the non-accommodated state.

According to the configuration, it is possible to achieve flush-surfacing in the accommodated state. On the other hand, in the non-accommodated state, the rear visibility by the camera 105 can be obtained. By switching those states in accordance with the state of the vehicle C, it is possible to achieve both securing the rearward visibility during travelling of the vehicle C and improving the designability with the vehicle body having a flush surface.

Also, the non-accommodated state includes the protruding state and the intermediate state. In the protruding state, the opening and closing operation of the rear side door 102 can be performed, and in the intermediate state, at least the rearward visibility by the camera 105 can be obtained. By switching those states according to the state of the vehicle C, the operability of opening or closing the door can be guaranteed, and further, it is possible to contribute to flush-surfacing of the vehicle body by securing a limited protrusion state while ensuring the rearward visibility during vehicle travelling.

Further, in the embodiment, when the door lock device 130 is in the parking state which is the locked state, the outside handle 111 becomes in the accommodated state and, when the door lock device 130 is in the unlocked state in the non-travelling state of the vehicle C, the outside handle 111 becomes in the protruding state. In addition, when the vehicle C is in the travelling state, the outside handle 111 becomes in the intermediate state.

According to the configuration, in the parking state, it is possible to achieve flush-surfacing. Thereby, it is possible to improve the designability of the vehicle C during parking. Furthermore, since the outside handle 111 is accommodated, the camera 105 mounted thereon is also accommodated inside the door outer panel 103. As a result, it is possible to prevent an accident such as the camera 105 being damaged or stolen while the vehicle C is parked.

On the other hand, when the vehicle C is not in the travelling state and the door lock device 130 is in the unlocked state, the operation of the outside handle 111 is predicted. Thus, in this state, the outside handle 111 becomes in the protruding state, so that the rear side door 102 can be opened and closed.

Also, since the camera 105 is exposed to the outside when the vehicle C is in the travelling state, the rear view can be recognized by the camera 105.

As a result, it is possible to achieve flush-surfacing without hindering the function of the electronic mirror device 120 during travelling nor hindering the opening and closing operation of the rear side door 102.

Fifth Embodiment

Hereinafter, the vehicle C to which a vehicle door according to a fifth embodiment is applied will be described. Also in the embodiment, the rear side door 102 will be described by way of example. Further, descriptions of configurations which are the same as those of the fourth embodiment will be omitted and the differences will be mainly described.

Figure 13:
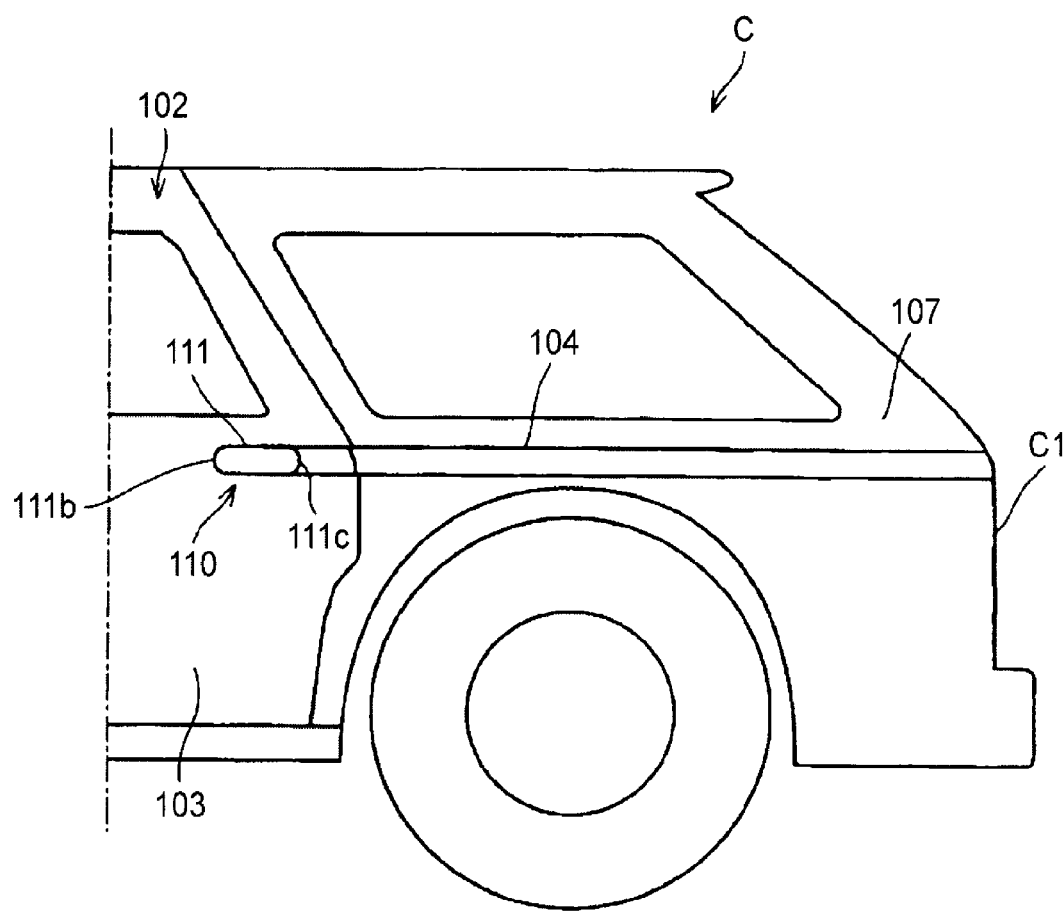
FIG. 13 is an explanatory view for illustrating a vehicle body side surface of a vehicle to which a vehicle door according to a fifth embodiment is applied.

FIG. 13 is an explanatory view for illustrating a vehicle body side surface of the vehicle C to which the vehicle door according to the fifth embodiment is applied. In the embodiment, a groove portion 104 of a concave shape is provided in the door outer panel 103 and the vehicle body panel 107 extending from the door outer panel 103 to the vehicle rear side. The groove portion 104 of a concave shape extends toward the vehicle rear side from the outside handle 111, specifically the rear end portion 111c thereof, to a vehicle body rear end portion C1 of the vehicle C. The groove portion 104 of a concave shape is provided so as not to obstruct the rear view of the camera 105 mounted on the rear end portion 111c of the outside handle 111.

The groove portion 104 of a concave shape allows the camera 105 provided at the rear end portion 111c of the outside handle 111 to be exposed to the outside even when the outside handle 111 is in the accommodated state.

According to the embodiment, the groove portion 104 of a concave shape is provided, and thus a monitoring range of the rear side of the vehicle C can be included in the angle of view of the camera 105 without being obstructed by the vehicle body. As a result, it is possible to appropriately obtain the rearward visibility by the camera 105 while achieving flash-surfacing.

Further, according to the embodiment, as indicated in the fourth embodiment, the outside handle 111 can protrude outward. Therefore, together with the groove portion 104 of a concave shape, it is possible to appropriately obtain the rear visibility by the camera 105.

Figure 14A:
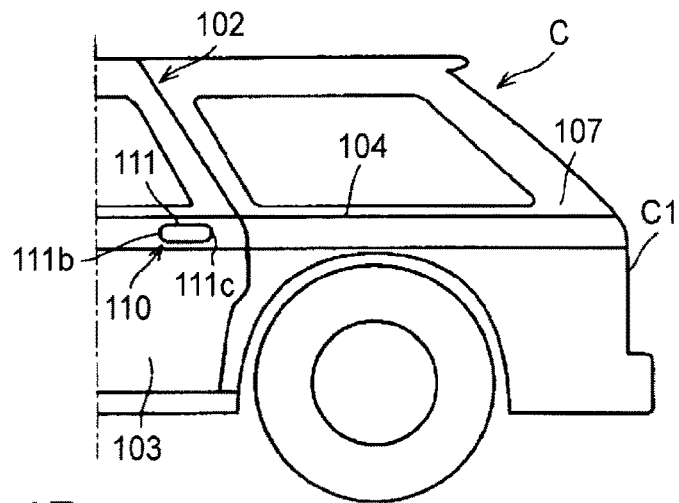
FIGS. 14A to 14C are views for explaining a modification example of a groove portion of a concave shape.
Figure 14B:
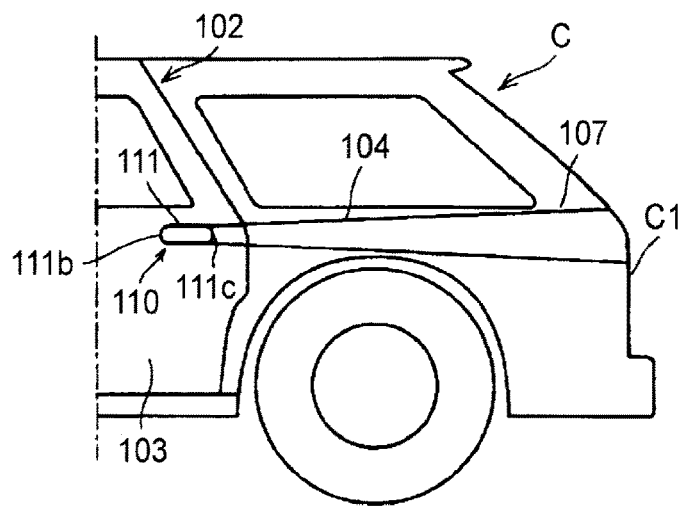
Figure 14C:
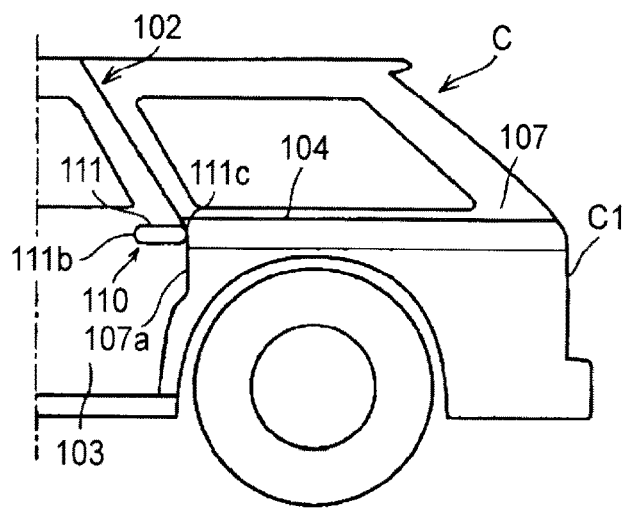

FIGS. 14A to 14C are views for explaining a modification example of the groove portion 104 of a concave shape. In a modification example illustrated in FIG. 14A, the width (the length along a height direction) of the groove portion 104 of a concave shape is set to be larger than the width (the length along the height direction) of the outside handle 111. According to the configuration, since the width of the groove portion 104 of a concave shape is set to be large, it is possible to suppress the influence of the vehicle body entering the angle of view of the camera 105. Thereby, it is possible to appropriately obtain the rearward visibility by the camera 105.

Further, in the modification example illustrated in the same drawing, the groove portion 104 of a concave shape extends toward the vehicle rear side from a predetermined position (for example, a vehicle body front end portion of the vehicle C or a front end portion of the rear side door 102) front further than the outside handle 111 to the vehicle body rear end portion C1 of the vehicle C. As described above, the position serving as a starting point of the groove portion 104 of a concave shape is not limited to the outside handle 111 (specifically, the rear end portion 111c thereof).

In the modification example illustrated in FIG. 14B, the width (the length along the height direction) of the groove portion 104 of a concave shape is set such that the width becomes gradually widened as the groove portion 104 of a concave shape goes toward the vehicle rear side. According to the configuration, since the width of the groove portion 104 of a concave shape becomes gradually widened, it is possible to reduce the influence of the vehicle body entering the angle of view of the camera 105. Thereby, it is possible to appropriately obtain the rearward visibility by the camera 105.

The modification example illustrated in FIG. 14C is based on the assumption that the outside handle 111 is disposed at the rear end portion of the door outer panel 103. In this case, the groove portion 104 of a concave shape extends toward the vehicle rear side from a front end portion 107a of the vehicle body panel 107 to the vehicle body rear end portion C1 of the vehicle C. In the example illustrated in the same drawing, the width of the groove portion 104 of a concave shape is set to be larger than the width of the outside handle 111, but the width may correspond to the width of the outside handle 111. Further, as illustrated in FIG. 14B, the groove portion 14 may be shaped to become widened as it goes toward the vehicle rear side.

As described above, the rear side door 102 according to the embodiment is suitable for forming the vehicle body side surface including the groove portion 104 of a concave shape provided in a range reaching the vehicle rear side at least from the outside handle 111, together with the vehicle body panel 107.

The embodiment is described based on the assumption that the outside handle 111 of a movable type which is displaced according to the state of the vehicle C as illustrated in the fourth embodiment is provided. However, the groove portion 104 of a concave shape may be applied to the outside handle 111 of a fixed type. In this case, even when flush-surfacing is performed on the outside handle 111, since the groove portion 104 of a concave shape is provided, the monitoring range of the rear side of the vehicle C can be included in the angle of view of the camera 105 without being obstructed by the vehicle body. As a result, it is possible to appropriately obtain the rearward visibility by the camera 105 while achieving flash-surfacing.

Hereinbefore, the vehicle door according to the embodiment is described. However, the present disclosure is not limited to the embodiments described above and it goes without saying that various modifications are possible within the scope of the invention.

For example, in the embodiment, the rear side door is exemplified as the vehicle door, but a front side door may be applied.

In the embodiment, the vehicle door is described, but a handle device itself mounted on the vehicle door functions as a part of the present disclosure.

Similarly, a vehicle equipped with the vehicle door also functions as a part of the present disclosure. In this case, the vehicle according to the present disclosure is characterized by including the vehicle door described above, the vehicle body panel extending to the vehicle rear side of the door panel and forming the vehicle body side surface together with the vehicle door when the vehicle door is closed, and a groove portion of a concave shape provided on the vehicle body side surface and extending at least from the handle main body to the vehicle rear side. However, the vehicle according to the present disclosure can be established even without including such a groove portion of a concave shape and a vehicle body panel, by including only the vehicle door described above.

Although the invention is described in detail with reference to the specific embodiments, it will be apparent to those skilled in the art that various changes and modifications can be made without departing from the spirit and scope of the invention. This application is based on Japanese Patent Application No. 2016-162631 filed on Aug. 23, 2016 and Japanese Patent Application No. 2017-033260 filed on Feb. 24, 2017, the contents of which are incorporated herein by reference.

REFERENCE SIGNS LIST 1 through hole
2 optical lens
3 imaging element
4 handle base
5 handle main body
6 mirror
C vehicle
C1 vehicle rear end portion
101 front side door
102 rear side door
103 door outer panel
104 groove portion
107 vehicle body panel
110 handle device
111 outside handle
111a outer surface
111b front end portion
111c rear end portion
112 actuator
113 handle control unit
120 electronic mirror device
121 electronic mirror control unit
122 display unit
121a image acquisition unit
121b image processing unit
121c image display unit
130 door lock device
131 latch

The invention claimed is:

1. A vehicle door outside handle device comprising:
a handle main body connected to a handle base, a through hole opening toward a vehicle rear side in a protrusion portion from a door side wall, wherein a mirror reflecting incident light rays from a vehicle rear side toward an inner side in a vehicle width is fixed to the handle main body, wherein an optical lens and an imaging element disposed in the through hole opening toward the vehicle rear side captures a mirror image of a substantial portion of the vehicle rear side including a vehicle side wall image reflected on the mirror, and the optical lens and the imaging element are fixed to the handle base.

2. A vehicle door comprising:
a door panel constituting an outside design surface of a door; and
a handle device disposed in the door panel,
wherein the handle device includes a handle main body and an imaging unit mounted on the handle main body and capturing images of rear side and lateral rear side of a vehicle in a non-accommodated state,
wherein the handle main body is configured to be accommodated inward of the door panel so as to be in an accommodated state that an outer surface of the handle main body is arranged substantially flat with respect to an outer surface of the door panel,
wherein the handle main body is configured to be switched to be in the non-accommodated state that the handle main body protrudes outward from the door panel and the imaging unit is exposed to an outside of the door panel, and
wherein the non-accommodated state includes a protruding state that the handle main body protrudes to a state that the handle main body can be operated, and an intermediate state that a part of the handle main body partially protrudes and the imaging unit is exposed to the outside of the door panel.

3. The vehicle door according to claim 2,
wherein the handle device includes a driving mechanism displacing the handle main body and a protrusion amount of the handle main body protruding outward from the door panel is changed in accordance with a state of a vehicle.

4. The vehicle door according to claim 3,
wherein the handle main body is in the accommodated state, when a door lock device provided in the door is in a parking state which is a locked state,
wherein the handle main body is in the protruding state, when the door lock device is in an unlocked state in a non-travelling state of a vehicle, and
wherein the handle main body is in the intermediate state, when the vehicle is in a travelling state.

5. The vehicle door according to claim 2,
wherein the vehicle door constitutes a vehicle body side surface together with a vehicle body panel located on a vehicle rear side of the door panel, when the vehicle door is closed, and
wherein the vehicle body side surface includes a groove portion having a concave shape and reaching at least from the handle main body to the vehicle rear side.

6. A vehicle comprising the vehicle door according to claim 2.

7. The vehicle door according to claim 2, wherein the outer surface of the handle main body is outermost with respect to a direction opposite to a direction of the inward accommodation.

8. The vehicle door according to claim 2, wherein the handle main body and the door panel are disposed approximately in parallel in the protruding state.

* * * * *